Oct. 5, 1965  A. G. PAGE  3,209,795
CONTROL NETWORK FOR MULTIPLE MODE FRACTION COLLECTOR
Filed Feb. 23, 1962  3 Sheets-Sheet 2

INVENTOR.
Archer G. Page.
BY
Flehr and Swain
ATTORNEYS.

Oct. 5, 1965  A. G. PAGE  3,209,795
CONTROL NETWORK FOR MULTIPLE MODE FRACTION COLLECTOR
Filed Feb. 23, 1962  3 Sheets-Sheet 3
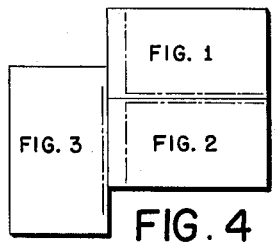
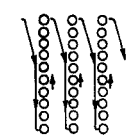
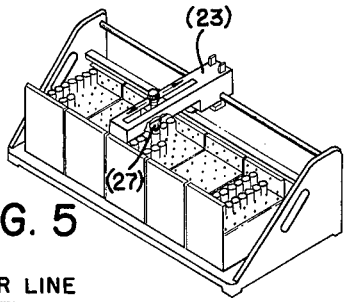
FIG. 4  FIG. 5A  FIG. 5
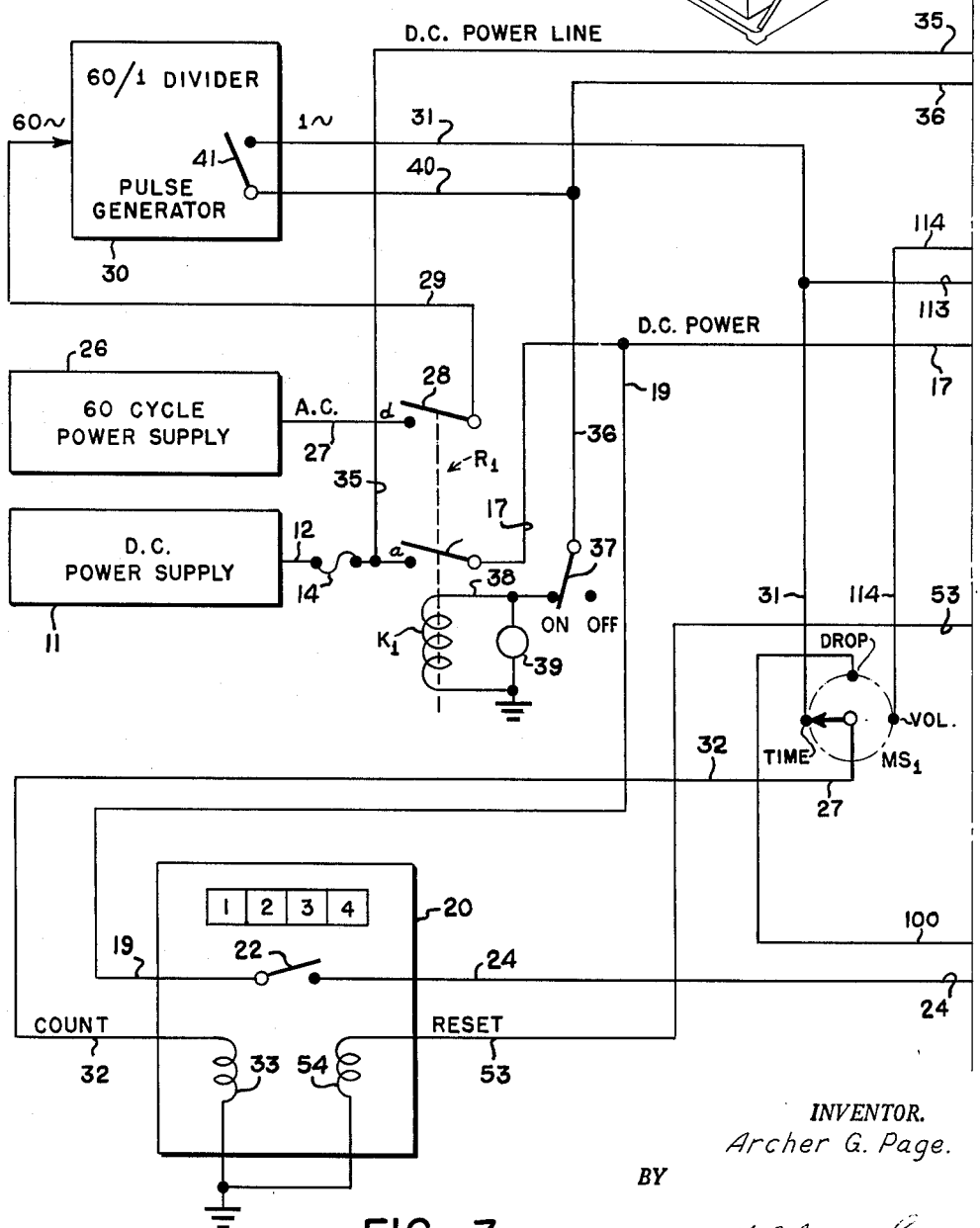
FIG. 3
INVENTOR.
Archer G. Page.
BY
Flehr and Swain
ATTORNEYS.

United States Patent Office 3,209,795
Patented Oct. 5, 1965

3,209,795
CONTROL NETWORK FOR MULTIPLE MODE FRACTION COLLECTOR
Archer G. Page, Fremont, Calif., assignor to Beckman Instruments, Inc., a corporation of California
Filed Feb. 23, 1962, Ser. No. 175,251
9 Claims. (Cl. 141—130)

This invention relates to fluid fraction collectors and more particularly to a control circuit therefor.

Fraction collectors are generally used to deliver a measured amount of fluid sample into each of a series of test tubes disposed in an array whereby an analysis of either the sample or collection pattern can be obtained. Fluid delivery has generally been by one of three methods, viz., counting of discrete drops, accumulating a predetermined volume, or by supplying the fluid for measured time periods.

Where the flow rate of fluid to the fraction collector is very small, discrete drops of fluid are supplied to the test tubes and counted as they are delivered. Where a higher flow rate of fluid to the fraction collector is to be encountered, measured volumes thereof are accumulated for each test tube and then delivered. It is sometimes desirable, however, to collect fluid for predetermined periods of time so that the amount thereof collected for such fixed periods can be examined for various periods during the day. In such an instance, collecting fluids by the time method is utilized.

In accordance with the present invention, an electrical network is provided for selective control of a single fraction collector apparatus, as for example as described in copending application Serial No. 175,252, filed February 23, 1962, operating selectively in any of the foregoing modes. The control circuit of the present invention incorporates a predetermined counter as a control element common to each manner of operation.

When the unit of fluid delivery is by discrete drops, an impulse generator sensing the drops transmits a pulse to the counter for each drop sensed. At a predetermined point in the cycle of the counter which corresponds to a selected number set into the counter, an output pulse operates a valve to terminate delivery. Further according to the invention, when fluid delivery is by measured time interval another impulse generator supplies the counter with a series of impulses at predetermined spaced time periods, e.g. one impulse per second. After a selected number of such timed pulses have been fed to the counter, the output of the counter is connected to terminate fluid delivery. Finally, when the unit of fluid delivery is by volumetric measure, as where an accumulated predetermined volume is supplied to the test tubes, the counter is connected to control a fluid delivering valve and hold it open for a related period which is long enough to insure complete drainage. In this style of operation, by varying the number in the counter, differing drainage periods can be obtained to accommodate various fluid viscosities.

Therefore, it is a general object of the invention to provide an improved control circuit for fraction collector apparatus.

It is another object of the invention to provide a control network for a multiple mode fraction collector.

It is yet another object of the invention to provide a control network for a plurality of fraction collecting modes of operation utilizing a predetermined counter as a control element in each.

A further object of the invention is the provision of a fraction collector control network wherein a timed pulse generator selectively controls either dispensing by measured time periods or dispensing by measured volumes.

These and other objects of the invention will appear from the following description in which the preferred embodiment has been set forth in detail in conjunction with the accompanying drawings.

Referring to the drawings:

FIGURE 1 is a portion of a schematic electrical network as incorporated in a movable dispensing unit, portions of which are shown in perspective.

FIGURES 2 and 3 constitute a schematic wiring diagram of the control network of the invention.

FIGURE 4 is an orientation of views of FIGURES 1, 2 and 3.

FIGURE 5 is a perspective view generally showing a fraction collecting apparatus.

FIGURE 5a schematically shows the pattern of movement of the apparatus in FIGURE 5.

The control circuit described below is particularly applicable to the control of a fraction collector of a type for example as generally shown in FIGURE 5 where in a dispensing unit is arranged to be advanced step-wise along a column of test tubes until it has serviced the last test tube in the column at which time the dispensing unit is laterally and forwardly moved to the start of an adjacent column where it again moves step-wise through the test tubes of the column. The step-wise movement of the dispensing unit along every column in the apparatus of FIGURE 5 progresses in the same direction, i.e. in a scanning fashion as in FIGURE 5a.

One such fraction collector is shown and described in copending patent application, Serial No. 151,833, filed November 13, 1961, and assigned to the assignee herein.

Figure 1:
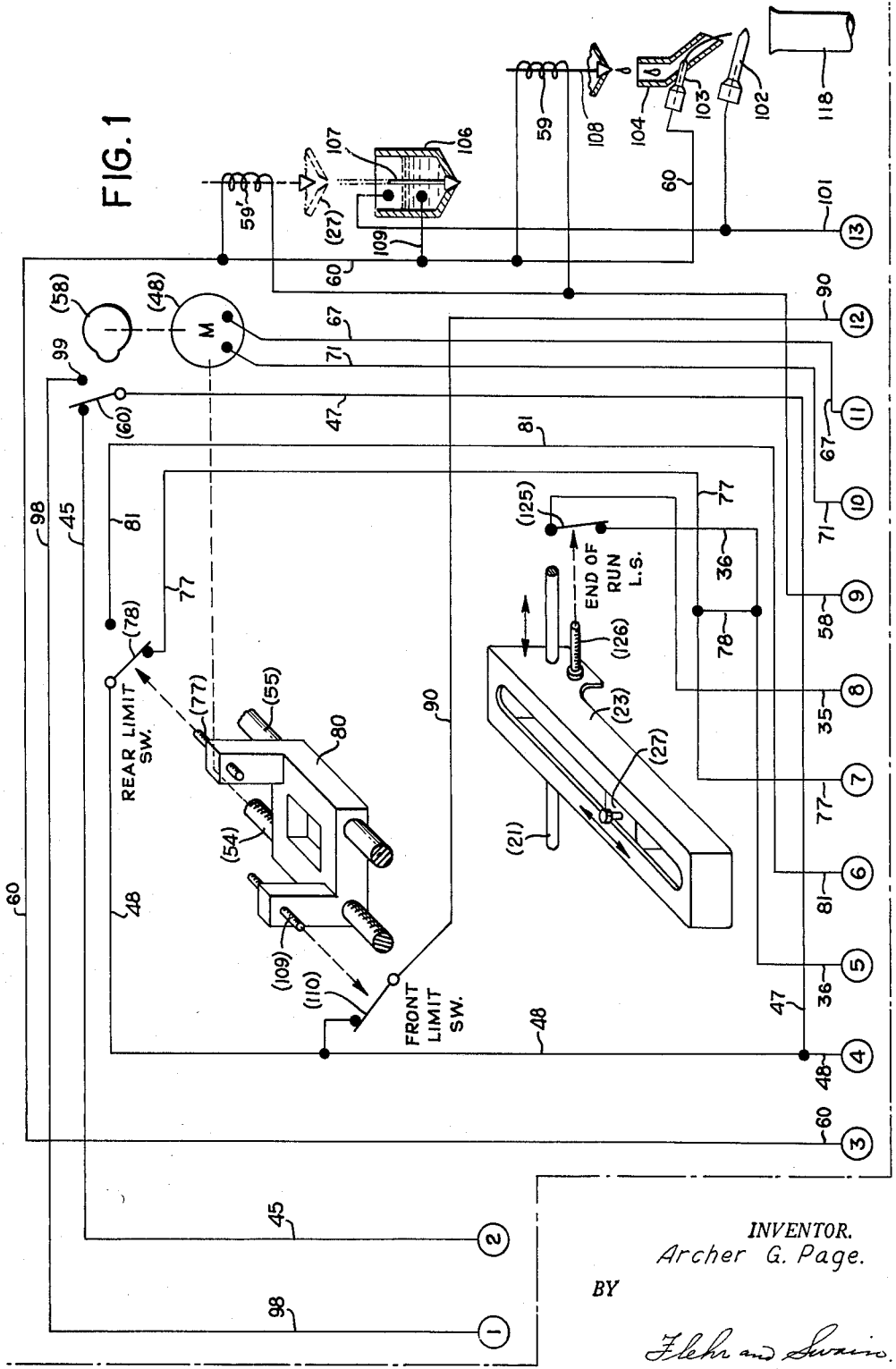

In the present invention, and with particular reference to the components shown in FIGURE 1, certain reference numerals appear in parentheses and these reference numerals, it will be understood, refer to substantially corresponding components to be found in the patent application identified next above. However, it is not believed that reference to the foregoing patent application will be necessary for a complete understanding of the present invention inasmuch as sufficient descriptive material relative thereto will be incorporated herein as the description proceeds. For example, in FIGURE 1, front and rear limit switches 110 and 78 are mechanically actuated by contact with a carriage 80 for supporting a dispensing unit 27 for movement along arm 23. These limit switches are biased normally to the positions shown. A motor 48 drives a lead screw 54 to move carriage 80 and also to rotate a cam 58 which controls a switch 60 serving to limit columnar displacement of carriage 80 to the distance between test tubes. Switch 60 is a snap-action switch having no neutral position.

As noted above, the present control circuit contemplates three different modes of operation of a fraction collector; namely, (a) by time, (b) by drop counting and (c) by a measured volume to each. It will be appreciated that in dispensing liquid according to a predetermined volume, there necessarily must be a time interval during which the dispensing unit or head drains completely of the accumulated volume before the dispensing unit is moved to the next subsequent test tube.

The counter utilized in the present invention in each of the three modes of operation, viz., (a) to count dispensing time, (b) to count drops and (c) to insure complete delivery, i.e., drain time, is any suitable preset or predetermined counter wherein the number of increments or units to be counted can be initially set up on the counter, and as each increment occurs the counter is stepped backward one digit at a time until it reaches zero. On reaching zero an impulse is generated by the counter which marks the end of the counting sequence. For example, if it is desired to count twelve drops of liquid on the counter 10, the number "12" can be set into the counter, and as each drop of liquid is counted, the counter steps backward toward "zero" one digit until "zero" is reached, at which time an output pulse is generated.

Figure 2:
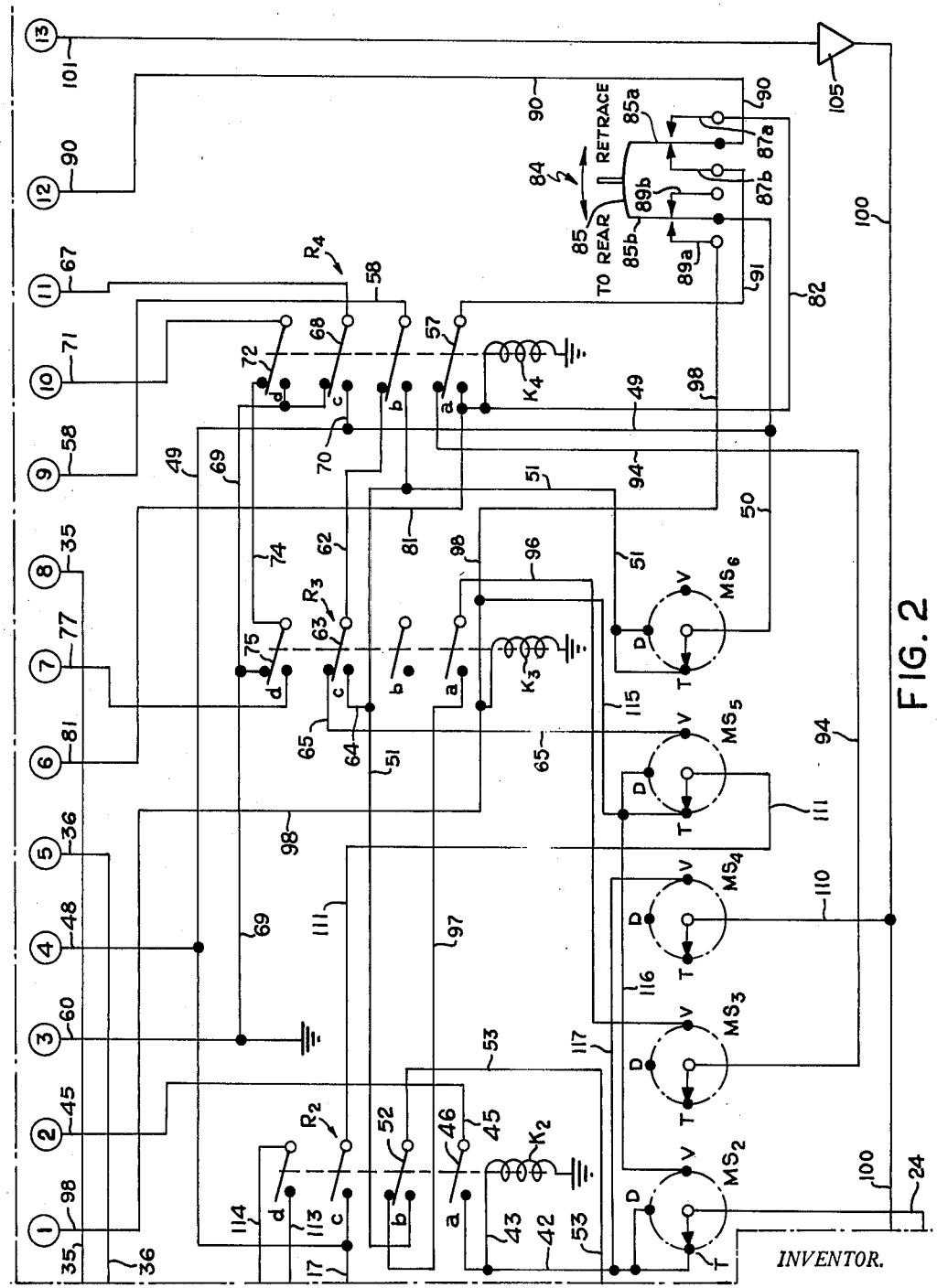

With FIGURES 1, 2 and 3 arranged as in FIGURE 4, a complete control network according to the present invention is provided. For convenience in transferring between FIGURE 1 and FIGURE 2 thirteen connection terminals are represented by encircled numerals 1–13. In practice these connection terminals are arranged between that portion of the circuitry which is found in the frame as shown in FIGURE 2 and that portion found in the movable arm 23 which includes the structure of FIGURE 1.

The control network is generally arranged around four relays R1–R4 which provide various circuit connections through their relay points $a$, $b$, $c$, or $d$. Thus, a given relay point can be identified as "R2$a$" for example to define the "$a$" point of relay R2. Coils K1–K4 are associated with each of R1–R4 respectively for operation.

With reference in general to the operation of the last above identified fraction collecting apparatus, it is to be understood that after dispensing unit 27 has departed from the last test tube position in the next-to-last column, arm 23 moves laterally to the last columnar position. At the same time unit 27 is proceeding along a "retrace" path to the first test tube in the last column. As arm 23 arrives in registry with the last column, a contact 126 mounted on the side thereof opens the "end-of-run" limit switch 125 and as will be seen, serves to deenergize all circuits when finally the rear limit switch 78 is struck by contact 77.

Proceeding now to the detailed description of the network, a D.C. power supply 11 is provided having an output lead 12 conected to a fuse 14, then to a relay point R1$a$, and by armature 15 of point R1$a$, to a lead 17 which therefore constitutes a power line. Line 17 is tapped by another lead 19 connecting into a predetermined counter 20.

Counter 20 is schematically represented to include a switch or contact point 22 arranged to be closed at a predetermined point in the cycle thereof to generate an output pulse as by connecting lead 19 to an output lead 24.

A timed pulse generator circuit is provided to include a 60 cycle power supply 26 coupled by a lead 27 to contact point R1$d$, an associated armature 28 to a conductor 29 leading into a pulse generator of suitable design, for example such as a 60:1 divider circuit. The pulse generator 30 is provided with an output lead 31 to transmit, for example one impulse per second from a 60 cycle input. Lead 31 connects to a first of six mode switches MS1—MS6. Mode switch MS1 is connected by a lead 32 to the input of predetermined counter 20, the input section being represented schematically by coil 33 which leads to ground. It is to be understood that after coil 33 has been pulsed a preselected number of times an output signal will be generated in the manner of conventional predetermined counters represented herein schematically as by closing a switch 22.

A holding circuit for relay R1 includes a lead 35 connected downstream of fuse 14 and leading via the "end-of-run" limit switch 125 of the fraction collecting apparatus making return by way of a lead 36, an "on-off" switch 37 and a branched circuit 38 one leg of which includes a coil K1 of relay R1 and the other leg of which includes a pilot light 39. A conductor 40 tapped onto lead 36 is connected to provide an output pulse for each sixty cycle period of applied current. This function is schematically shown as switch or contact point 41 included as a part of pulse generator 30. Therefore, once during every 60 cycles switch 41 will momentarily close. close.

The output conductor 24 of counter 20 connects into a mode switch MS2. Six such mode switches MS1–MS6 are provided, each being positionable to any one of three positions "T," "D" and "V," which correspond to their condition when the network is operating in the time, drop counting, or volume dispensing mode of operation. Switches MS1–6 are ganged together to selectively establish control for any one of the above three manners of operation.

The "T" and "D" positions of MS2 are connected to a lead 42 coupled to a lead 43 to operate the coil K2 of relay R2. Lead 42 is further connected to relay contact point R2$a$ and thence to conductor 45 via armature 46 of contact point R2$a$. Lead 45 connects through a displacement limiting switch 60 of the fraction collecting apparatus to a power line 17 via a conductor 47, conductor 48, and a lead 49.

Conductor 49 also connects to a lead 50 coupled to mode switch MS6. The "T" and "D" positions of MS6 are further connected to a lead 51 terminating at the lower contact of relay point R2$b$. Armature 52 of relay point R2$b$ is connected by counter reset line 53 running to the reset section of counter 20. The reset section of counter 20 is schematically illustrated as a coil 54 connected to ground.

The lower contact of relay point R4$b$ is connected to lead 51 by a conductor 56. The armature 57 of point R4$b$ is connected to a line 58 for controlling a solenoid coil 59 of a normally open valve for time and drop mode dispensing. The upper terminal of coil 59 is connected to line 60 which leads to ground. Coil 59 is wound in a "hand" which will push an armature away when energized. The upper contact of relay point R4$b$ is connected by a line 62 to the armature 63 of a relay point R3$c$. Armature 63 is operable between a lower and upper contact of relay point R3$c$, the lower contact being connected by conductor 65 to the "V" position of mode switch MS5.

A fraction dispensing apparatus as shown in FIGURE 5, components of which are shown in FIGURE 1, includes a motor 48 which drives a cam 58 to operate a displacement limiting switch 60. Motor 48 also drives a lead screw 54 to move an interchangeable head carriage 80 back and forth along arm 23. One side of motor 48 is connected by a lead 67, armature 68 of a relay point R4$c$ the upper contact of which is connected to a grounded wire 69. The lower contact of relay point R4$c$ is tapped into conductor 49 by a lead 70. The other side of motor 48 is electrically connected by lead 71, armature 72 of relay point R4$d$, and the upper contact of R4$d$ to ground via wire 74, armature 75, upper contact of relay point R3$d$, and conductor 69. The lower contact of relay point R3$d$ is coupled to a conductor 77 via a rear limit switch 78 to lead 48 and back to D.C. power via leads 49 and 17. Conductor 77 is connected by a jumper 78 to lead 36 to establish a power circuit bypassing "end-of-run" limit switch 125 as traced from line 17, leads 49, 48, switch 78, conductor 77, jumper 78, lead 36, on-off switch 37 and circuit 38. Thus, subsequent to energizing relay R–1 power from line 17 will be available on line 36 via rear limit switch 78 notwithstanding the fact that "end-of-run" limit switch 125 is open during stepwise movements of unit 27 around the last column of test tubes.

In the fraction collecting apparatus being controlled, rear limit switch 78 is arranged to be struck by a contact 77 adjustably positioned in a traveling dispensing head mount or carriage 80 so as to momentarily link lead 48 and a conductor 81 to pick relay R4 via lead 82 and coil K4. Lead 82 further extends to a three position manual control switch 84 having a manually movable armature 85 including a pair of conductive legs 85$a$ and 85$b$. Switch 84 includes a pair of contact points 87$a$, 87$b$ and 89$a$, 89$b$ respectively associated with legs 85$a$ and 85$b$. The contact points are resilient so as to bend when legs 85$a$, 85$b$ bear against them. In the neutral position shown, 87$b$ is contacting 85$a$ and 89$b$ is contacting 85$b$. Conductor 82 is connected to point 87$a$.

Three-way switch 84 is arranged so that by manual movement of armature 85 to the right, lead 82, via point 87a and leg 85a, is connected to wire 90 to front limit switch 110 arranged to be struck by an adjustable contact 109 carried by movable carriage 80. The other side of switch 110 is connected back to power via leads 48, 49 and 17.

The intermediate position of switch 84 serves to connect lead 90, via leg 85a and contact 87b, to conductor 91, the armature 57 of relay point R4a and, in its upper position, to lead 94 running to mode switch MS3.

The "V" position of mode switch MS3 runs to the armature 95 of a relay point R3a by means of lead 96. Point R3a is connected by wire 97 to the upper contact of relay point R2b.

The leftward position of switch 84 serves to pick coil K3 by connecting power lead 50 via leg 85b and contact 89a to conductor 98. Conductor 98 is connected via coil K3 to ground. Conductor 98 also connects via contact 99 of displacement limiting switch 60 to make connection with conductor 47 returning to power via leads 48, 49 and 17.

The "D" position of mode switch MS1 is connected by conductor 100 to a ground sensing amplifier 105 of suitable construction capable of sensing the difference between an open circuit and a grounded circuit. For example a triode can be used under control of lead 101. One suitable arrangement would be to direct couple the triode grid to lead 101 and supply a negative bias through a high impedance to cause the triode to be cut off. Upon grounding the grid by means of lead 101, the triode will start to conduct causing a signal to appear on the anode. This signal is utilized to operate the relay coil.

Referring to FIGURE 1 a drop counting head can be placed to ride in carriage 80. One such head having a pair of conductive pins 102, 103 disposed to be coupled by each discrete drop of liquid channeled along a tube 104 will electrically couple lead 101 to ground via conductor 60. Control of drop dispensing is by a normally open valve 108 closed by energizing solenoid 59.

A measured volume dispensing head 106 having a normally closed valve 107 controlled by a solenoid 59' can also be used in carriage 80. To detect a measured volume, lead 101 is arranged to terminate at a predetermined level within head 106 while a tap 109 connecting conductor 60 terminates within head 106 at a point in a lower region thereof. Thus when the liquid in head 106 reaches a predetermined level, lead 101 is coupled by means of the fluid to tap 109 and subsequently to ground via lead 60.

Amplifier 105 is also connected by conductor 100 to MS4 by wire 110. Relay point R2c of relay R2 is arranged to connect power line 17 to mode switch MS5 via lead 111. Relay point R2d functions to supply timed pulses to lead 31 via conductor 113, R2d, wire 114 to the "V" position of mode switch MS1. With regard to mode switch MS5, the "T" and "D" positions are connected by line 115 to conductor 9 so as to energize K3 on closure of R2c. Conductor 98 is also coupled by lead 115 to the "V" position of mode switch MS2 along a line 116. Finally, the "V" position of mode switch MS4 is connected to lead 42 by a line 117.

Time mode operation

Assuming that the mode switches MS1–MS6 are all conditioned to the "T" or time mode position and that on-off switch 37 is turned off, the operation of the above described network to dispense fluid in accordance with a predetermined measured period of time is commenced by turning switch 37 "on." This action energizes coil K1 to close the contact points for relay R1. With relay R1 closed, R1a establishes a holding circuit for R1 and supplies 60 cycle A.C. for conversion by pulse generator 30 to provide an output pulse rate of one per second on conductor 31. Pulses on conductor 31 are fed to the input of counter 20 so that after a predetermined number of seconds corresponding to the selected number as set up in the counter, switch 22 will close to provide an output pulse on line 24 fed via mode switch MS2 to pick relay R2 via coil K2. With the closure of relay point R2a, a holding circuit for relay R2 is established from power line 17 via leads 49, 48, 47 displacement limiting switch 60, lead 45 and armature 46 of point R2a. It is to be observed that as soon as motor 48 commences to run to move the dispensing head carriage, displacement limiting switch 60 will interrupt operation of the R2 holding circuit.

Energizing relay R2 also transmits a "reset" pulse to counter 20 via lead 53 and lower contact of point R2b. Relay point R2c serves to pick relay R3 via mode switch MS5, leads 115, 98, and coil K3.

As coil K3 is energized to pick R3, the normally open valve 108 operated by solenoid coil 59 is energized by a circuit including power lead 49, conductor 50, mode switch MS6, lead 51, R3c (lower), R4b (upper), lead 58, coil 59 and to ground via lead 60. Thus the output of counter 20 serves to terminate time delivery of fluid from valve 108.

Energizing relay R3 also drives motor 48 to operate lead screw 54 so as to move a head transported by carriage 80 to the next test tube position. The circuit for operating motor 48 includes power leads 49, 48, rear limit switch 78, lead 77, R3d (lower), R4d (upper), lead 71, motor 48, and return to ground via R4c (upper). Thus it can be seen that R4c and R4d control the drive of motor 48.

As cam 58 is driven far enough to release switch 60, the holding circuit for R2 is interrupted followed by establishment of a holding circuit for R3 via lead 98, connection terminal No. 1 and coil K3, power being supplied from lead 47 via connecting terminal No. 4. Energizing K3 through switch 60 keeps the valve 108 closed during the transfer movement of the dispensing head to the next dispensing location by maintaining armature 63 upon contact R3c (lower). Motor 48 continues to run until switch 60 is mechanically transferred by the lobe on cam 58. As switch 60 is transferred, R3 is released thereby grounding both sides of motor 48 which abruptly stops the movement of same. At the same time valve solenoid 59 is deenergized by opening of R3c (lower). Valve 108 being biased normally open fluid delivery will recommence.

It is to be noted that counter 20 continues to be advanced by the time pulse generator 30 except during reset time which is considerably less than one second duration. Thus, counter 20 counts every interval generated by pulse generator 30. Accordingly, even though fluid delivery may be momentarily interrupted by the closing of the delivery valve 108, where a steady stream of fluid is supplied to the fraction collector apparatus the amount of fluid which backs up in the system during the period the valve is closed will be accounted for and measured in terms of time even though delivery of that fluid is momentarily delayed.

While the extent of this delay will cause a backing up of less than a second's worth of fluid during head travel between adjacent test tube positions nearly eight seconds' worth of fluid is accumulated in the system during the time the dispensing head is retracing from the last test tube in one column to the first test tube in the next column. Accordingly, if the counter did not continue to run during this time, the accumulated fluid for the period of valve closure would be deposited in the first test tube of the next adjacent column without being measured or accounted for in terms of time.

The above described stepping movement continues until the last test tube in a given column has been serviced. As carriage 80 moves from the last position in the column, rear limit switch 78 is momentarily transferred to connect leads 48 and 81 thereby picking relay R4. Relay point R4a (lower) establishes a "retrace" holding circuit via switch 110 which maintains coil K4 energized during the retrace movement of the head. Energizing relay R4 serves also to energize solenoid coil 59 to close valve 108 via point R4b (lower), leads 56, 51, mode switch MS6 and leads 50, 49, and 17. It is to be noted that solenoid 59 thereby is maintained energized through a circuit by-passing R3 (and control by switch 60) whereas during the stepping movement of a dispensing head, solenoid 59 is energized to close valve 108 via armature 63 of relay point R3c.

The retrace holding circuit through R4a (lower) also reversed motor leads at points R4c and R4d so as to reverse the drive of motor 48 until front limit switch 110 is mechanically opened by contact 109.

As front limit switch 110 is opened, retrace holding circuit via R4a (lower) is interrupted to release R4 so as to reverse motor leads 67, 71 as well as to place the valve back under control of R3 so that displacement limiting switch 60 again controls its operation. It should be noted that by shunting out switch 60, this manner of controlling solenoid 59 insures that during the retrace movement of the dispensing head, fluid will not be spilled or leaked therefrom until the head has arrived in position for dispensing.

As noted above, each retrace movement of the dispensing head is accompanied by a rightward lateral displacement of arm 23. Ultimately the last test tube in the next-to-last column will have been serviced and further lateral rightward movement of arm 23 will mechanically open the "end-of-run" limit switch 125. Thus, when rear limit switch 78 is finally struck, coil K1 will be deenergized, thereby opening the relay points of R1 to terminate the operation.

*Drop counting mode*

Assuming mode switches MS1–MS6 are all turned to the "D" or drop counting position, and assuming that fluid is to be dispensed via tube 104 into test tubes 118, the input 32 of counter 20 is coupled via MS1 and ground sensing amplifier 105 to pin 102. Thus as each discrete drop of fluid serves to electrically couple pin 102 to pin 103, amplifier 105 senses ground and generates an input pulse for counter 20. A comparison of the "T" and "D" positions of mode switches MS2–6 shows that electrically equivalent functions are performed in either position.

Therefore, at a predetermined point in the cycle of counter 20 corresponding to the preselected number set up therein, an output pulse appears on lead 24 to pick R2 to commence operation in the manner of the time dispensing mode described above.

Inasmuch as it is to be understood that solenoid 59 controls valve means supplying fluid to tube 104, whenever the valve means is closed and the flow of fluid is discontinued no pulses will be supplied to counter 20.

*Volume dispensing mode*

When fluid is to be delivered in measured volumetric amounts, a head such as dispensing unit 106 can be provided in carriage 80 and arranged so as to open valve 107 by means of solenoid 59'. It is to be understood that solenoid 59' is connected to leads 58 and 60 in the same manner as solenoid 59. Solenoid 59' however is wound in an opposite hand to that of 59 and accordingly when it is energized will open valve 107 rather than to push it closed as in the time and drop counting head.

To operate the network in a volume dispensing mode, switches MS1–MS6 are conjointly turned to the volume or "V" position thereof. As fluid is accumulated in head 106 conductor 101 eventually becomes electrically coupled to tap 109 whereby amplifier 105 detects such coupling. Amplifier 105 transmits a pulse via leads 100 and 110, mode wsitch MS4 to pick relay R2. As relay R2 closes its associated contacts, a holding circuit via R2a is established and valve 107 is raised to dispense the fluid from head 106. Energizing coil 59' is effected via point R2c and MS5. R2d serves to supply a series of timed pulses via MS1 to the input of counter 20.

At a predetermined time in the cycle of counter 20 an output pulse on lead 24 serves to pick R3 via MS2. With the picking of R3, motor 48 is driven to the next test tube under control of a circuit through R3d (lower). The motor circuit through R3d (lower) includes rear limit switch 78. Picking of R3 also serves to deenergize via R3c (lower) solenoid 59' to permit valve 107 biased normally closed to seal the bottom of head 106. R3a is closed at this time to partially establish a circuit for resetting counter 20 so that as the forward drive of motor 48 opens switch 60 to release R2, relay point R2b (upper) will connect lead 97 to reset lead 53.

Upon initiation of the stepping movement of carriage 80, switch 60 couples leads 47 and 98 to provide a holding circuit for R3. By holding R3 until cam 58 operates switch 60, the motor will continue to move with the valve remaining closed. When cam 58 again transfers switch 60, R3 is deenergized thereby stopping the drive of motor 48 by grounding both leads 67, 71 thereto via R3d (upper). Release of R3 also partially sets up the valve operating circuit through R3c (upper), whereby subsequent closing of R2c will energize solenoid 59'.

The above operation continues step-wise along a given column until the last test tube in the column has been serviced. Upon leaving the last test tube position in the column, rear limit switch 78 is momentarily placed to couple lead 48 to lead 81 thereby picking R4 via leads 81, 82, and coil K4. Energizing relay R4 serves to establish the holding circuit via R4a (lower) which includes the front limit switch 110. At the same time solenoid 59' is maintained biased closed since the valve control point R4b (lower) was initially disconnected from power lead 50 via mode switch MS6. Thus point R4b (lower) is an inactive contact point. Energizing R4 serves also to reverse motor leads at R4c and R4d causing carriage 80 to be driven toward the front limit switch until the retrace holding circuit is interrupted. Interruption of the retrace holding circuit again reverses motor leads 67, 71 so as to reverse the drive of carriage 80 until cam 58 operates switch 60 thereby preparing the holding circuit via R2a for picking.

Upon reaching the end of the run, power is cut as in the time mode of operation to release R1.

*Manual control*

By leftwardly displacing armature 85 of manual three-way switch 84, the dispensing unit is driven to the rear of arm 23 by connecting lead 98 to pick relay R3. Energizing relay R3 through interconnection of leads 50 and 98, switch 60 is by-passed so that the dispensing head is driven steadily to the rear.

Manual movement of armature 85 to the right to the "retrace" position serves to energize relay R4 via front limit switch 110 so as to reverse the drive of motor 48 at points R4c and R4d.

Having thus described the controlling network for a fraction collector apparatus operating in any of three modes, it will be apparent that a single predetermined counter is advantageously arranged to constitute a control element common to each mode.

While there have been shown and described and pointed out the fundamental novel features of the invention as applied to the preferred embodiment, it will be understood that various omissions and substitutions and changes in the form and details of the apparatus illustrated and in its operation may be made by those skilled in the art, without departing from the spirit of the invention. It is the intention, therefore, to be limited only as indicated by the scope of the following claims.

I claim:

1. A fraction collector including a fluid dispensing unit for supplying a predetermined number of delivery units of fluid at each of a series of positions, a valve controlling delivery thereof, a control circuit comprising a predetermined counter serving to generate an output signal at a predetermined point in the cycle thereof, impulse generator means serving to transmit a series of time based impulses to the counter representative of said delivery units for each position, and circuit means serving to move the valve to control the flow of fluid via the dispensing unit, said circuit means being operatively responsive to the output signal to effect said control.

2. A fraction collector including a fluid dispensing unit for supplying a predetermined number of delivery units of fluid delivery at each of a series of positions, a valve controlling delivery thereof, a control circuit comprising a predetermined counter serving to generate an output signal at a predetermined point in the cycle thereof, a coil connected to operate said valve, impulse generator means for transmitting a series of time based pulses to the counter in accordance with said delivery units of fluid for each position, and circuit means operatively responsive to the output signal to operate said coil to control delivery from said dispensing unit.

3. In a fraction collector having a fluid dispensing unit for supplying a predetermined number of delivery units of fluid at each of a series of positions, a valve controlling fluid delivery, motive means connected to move said dispensing unit from one said position to the next, a control circuit comprising a predetermined counter serving to generate an output signal at a predetermined point in the cycle thereof, a coil connected to operate said valve, a time based impulse generator means serving to transmit on a time base a predetermined number of time based pulses to the counter corresponding to said delivery units of fluid for each position, means operatively responsive to the output signal and connected to operate said coil to control delivery from said dispensing unit, the last named means further serving to energize said motive means to move said dispensing unit to the next said position in said series, and means for deenergizing said motive means and for reversing the operation of said coil when said dispensing unit has arrived at the next said position in said series.

4. In a fraction collector, apparatus including a fluid delivering unit for supplying a measured amount of fluid at each of a series of positions, a valve controlling delivery of fluid from said unit, means selectively operable to form a stream of said fluid into discrete drops thereof, a control circuit including predetermined counter means for generating an output pulse at a predetermined point in the cycle thereof, means for setting up a preselected number in the counter in accordance with the measured amount of fluid to be delivered, first impulse generator means for transmitting an impulse to the counter for each drop of fluid delivered, second impulse generator means for transmitting on a time base a series of impulses at predetermined spaced time intervals to the counter, means connected to apply said output pulse to operate said valve, and means serving to selectively couple one or the other of said impulse generators to said counter to control fluid delivery thereby.

5. In a fraction collector, apparatus including a fluid delivering unit for supplying a measured amount of fluid at each of a series of positions, a valve controlling delivery of fluid from said unit, means selectively operable to form a stream of said fluid into discrete drops thereof, a control circuit comprising predetermined counter means for generating an output pulse at a predetermined point in the cycle thereof, means for setting up a preselected number in the counter in accordance with the measured amount of fluid to be delivered, said counter having input and output means, first impulse generator means for transmitting an impulse to said input for each drop of fluid delivered, second impulse generator means for transmitting a series of impulses at predetermined spaced time intervals to said input, means connected to operatively couple said output to operate said valve, and means serving to selectively couple one or the other of said impulse generators to said input to control fluid delivery thereby.

6. A fraction collecting arrangement as defined in claim 5, wherein said second impulse generator is operatively coupled to respond to opening of said valve, and said output of the counter is connected to apply said output pulse to close said valve.

7. In a fraction collector apparatus including a fluid delivering unit for supplying a measured amount of fluid at each of a series of positions, means for stepping said unit to said positions, normally open valve means for dispensing a predetermined measure of fluid and normally closed valve means for dispensing a predetermined accumulated volume of fluid, a control circuit comprising a predetermined counter having input and output means, said counter serving to generate an output signal at a predetermined point in the cycle thereof, means for setting up a preselected number in the counter in accordance with a measured amount of fluid to be delivered, an impulse generator means for transmitting on a time base a series of impulses at predetermined spaced time intervals, first circuit means operatively responsive to opening of said normally closed valve means and connected to hold open said normally closed valve means and to apply said series of impulses to said input means of the counter, and second circuit means operatively connecting said output to interrupt the holding action of said first circuit means and connected further to close said normally closed valve in response to said output signal, third circuit means operatively coupling said impulse generator to said input means in response to opening of said normally open valve, and fourth circuit means connecting said output signal to close said normally open valve at said predetermined point in the cycle of said counter, and means for selectively operating either said first and second circuit means or said third and fourth circuit means to deliver a measured amount of fluid in accordance therewith.

8. In a fraction collector apparatus for supplying a measured number of units of fluid delivery at each of a series of positions and constructed to operably include either of two dispensing heads, a first of said heads having means for forming a stream of fluid into discrete drops thereof together with a normally open valve for controlling fluid delivery therefrom, and a second of said heads having means for accumulating a measured volume of fluid and a normally closed valve for controlling fluid delivery therefrom, said fraction collector further having a predetermined counter serving to generate an output signal at a predetermined point in the cycle thereof, the counter having an input for receiving pulses to be counted and an output for delivering said output signal, and having drop sensing means associated with said first of said heads for detecting each drop of fluid delivered, and volume sensing means associated with said second of said heads for detecting the accumulation of said measured volume of fluid therein, and still further having a timed pulse generator means for generating a series of pulses at predetermined intervals, a control circuit comprising first circuit means operatively coupling the input of said counter to said drop sensing means and coupling the output of said counter to close said normally open valve in response to said output signal, second circuit means operatively coupling the input of said counter to said timed pulse generator means, and coupling the output of said counter to close said normally open valve in response to said output signal, third circuit means operatively responsive to opening of said normally closed valve to couple said input of the counter to said timed pulse generator means, said third circuit means further including means for holding said normally closed valve open during delivery of a measured volume of fluid therefrom, said holding means being responsive to said output signal to close said normally closed valve to accumulate another measured volume of fluid therein, and means common to said first, second and third circuit means for selectively establishing one of said three circuit means, whereby said counter selectively controls the apparatus in delivery of a predetermined number of drops of said fluid, delivery of said fluid for a predetermined number of timed intervals, or to insure complete drainage of a measured volume of said fluid.

9. A control circuit comprising a predetermined counter means for generating an output signal at a predetermined point in the cycle thereof, means for setting up a preselected number in the counter representing a number of units to be counted, said counter having input and output means, first impulse generator means for transmitting an impulse to said input, each impulse representing a unit according to one unit of measure, second impulse generator means for transmitting a series of impulses at predetermined spaced time intervals to said input, said time intervals representing a second unit of measure, an electrically operated device to be selectively controlled by one or the other of said impulse generators, means connected to operatively couple said output to said device, and means serving to selectively couple one or the other of said impulse generators to said input to control said device.

References Cited by the Examiner

UNITED STATES PATENTS

| | | | |
|---|---|---|---|
| 2,604,249 | 7/52 | Gorham | 141—130 |
| 3,124,172 | 3/64 | Paxson | 141—130 |

LAVERNE D. GEIGER, *Primary Examiner.*

LOUIS J. DEMBO, *Examiner.*